United States Patent Office 3,330,667
Patented July 11, 1967

3,330,667
TOPPING COMPOSITION CONTAINING GLYCOL AND GLYCEROL ESTERS
Charles J. Tressler, Hawthorne, N.Y., assignor to General Foods Corporation, White Plains, N.Y., a corporation of Delaware
No Drawing. Filed Jan. 27, 1964, Ser. No. 340,516
6 Claims. (Cl. 99—139)

This invention relates to the production of dried powders for use as toppings adapted to be reconstituted in milk or water and whipped to a stable high overrun product.

United States Patent No. 2,913,342 to Cameron et al. discloses preparation of dried emulsions capable of being whipped with milk or water into a stable whipped topping for use on food products. This product essentially involves employing the partial ester of a glycol like propylene glycol and a saturated fatty acid such as stearic or palmitic acid. The product represents a significant advance in the art in that it affords a dried emulsion of fat in proteinaceous and carbohydrate encapsulating solids which is adapted to be readily reconstituted and whipped to a high overrun of acceptable mouth feel. Dried emulsions for use as topping powders prior to the invention of the Cameron et al. patent failed to provide a satisfactory product in that the emulsions simply failed to whip, or if they did provide some overrun, produced a greasy mouth feel.

Although the invention of the Cameron et al. patent does represent a significant improvement in respect of the time period called for in whipping, the time requirement usually is in the order of 2 to 5 minutes depending upon the type of mixing used, either hand, whisk or mechanical. A dried emulsion wherein the emulsifier employed is propylene glycol monopalmitate affords a product having a whipping time of about 1 to 2 minutes under mechanical whipping. However, compositions employing this desired emulsifier are prone to experience rapid churnout (separation of the fatty phase from the nonfatty phase when the product is reconstituted and whipped at room temperature), particularly when whipped at elevated room temperature in the neighborhood of 90° F. Thus, a product employing propylene glycol monopalmitate as its principal emulsifier could be characterized as erratic in its performance even when the reconstituting aqueous liquid, to wit, milk and the culinary utensils employed to prepare the topping are chilled; indeed such a phenomenon was found to occur even when a dried emulsion was prepared that was "tempered" in the manner that term is defined and understood in the aforesaid Cameron et al. patent.

The present invention is founded on the discovery that by employing a glycerol monoester of a saturated fatty acid, such as stearic and still higher fatty acids, ranging upwardly in chain length from 18 carbon atoms, at a level, at least 2% by weight of the aforesaid glycol esters of palmitic acid in the fat phase of the dried emulsion, churn tolerance is afforded to such emulsions. Thus, powdered topping of the type disclosed in the Cameron et al. patent wherein the propylene glycol monopalmitate is the principal emulsifier can reliably be employed under all anticipated conditions of preparation while enjoying an advantageously short whipping time of 1 to 2 minutes without any collateral separation of the fat phase during whipping. It appears that the glycerol monoesters of the aforestated class do not offer any significant whipping property to the product, and indeed, to some extent function to retard whipping; it is thought the glycerol monoesters serve in the present system to arrest the tendency of highly whippable emulsions to undergo phase separation. The glycerol monoester of the saturated higher fatty acid, typically glycol monostearate, is preferably incorporated directly into the fat phase of the dried emulsion; alternatively, a dried powderous emulsion containing the glycerol esters may be separately prepared and this powder blended with a dried emulsion containing little or no glycerol monostearate but employing the propylene glycol monopalmitate. Thus, it is the feature of the invention that the glycerol monostearate and its equivalents can be employed prior to reconstitution either internally or externally of the fat phase that contains the propylene monopalmitate; and any means that will afford intimacy of contact commensurate with the requisite reconstitutability of the product and availability of the glycerol ester in the reconstituted emulsion may be employed; the glycerol monostearate and its companion whip modifiers should be present and available for release upon reconstitution of the dried emulsion containing the propylene glycol monopalmitate so that the former will constitute a part of the fat phase. While the glycerol monostearate is preferably encapsulated in a suitable proteinaceous as well as carbohydrate matrix material of the type disclosed in the Cameron et al. patent, it is not essential that a proteinaceous encapsulating agent be employed since any agent which will promote the availability of the glycerol monostearate in a powderous product may be used. The nature of the encapsulation will depend upon the physical characteristics of the glycerol monoester of the higher fatty acids; glycerol monostearate may be employed in a relatively purified form or may be diluted to some extent by other glycerol esters native to it in its esterified and/or distilled form. Thus glycerol diesters of fatty acids may be combined with the glycerol monostearate. It is essential however, that the glycerol monoester class be employed at a level sufficient to promote the requisite churn tolerance which level will in turn depend upon the level of propylene glycol monopalmitate employed: the level of this glycol ester, usually 5 to 15% by weight of the solids in the dried emulsion and the level of glycerol ester employed, will vary directly as the level of churn tolerance required. On the other hand, too high a level of the glycerol monoester class should not be employed because as the level thereof increases, say above 30% by weight of the glycol ester, a point is reached whereat further increases in percent composition produce poor whippability and contribute a greasy mouth feel to the product.

Among the members of the class of glycerol monoesters which can be employed in accordance with the precepts of the present invention are; glycerol monostearate, glycerol monobehenate, glycerol monoarachidate and any other higher saturated fatty acid compatible with mouth feel.

The use of propylene glycol monopalmitate in accordance with the spirit of the present invention is not intended to foreclose the presence of some other functional partial glycol ester of a saturated fatty acid such as propylene glycol monostearate provided the level thereof is a minor proportion of the total level of such glycol esters in the formulation, preferably less than 30%.

For convenience in demonstrating features of the present invention, spray dried emulsions were prepared to evaluate the whipping performance characteristics of spray dried topping powder containing propylene glycol monopalmitate blended with spray dried emulsions containing glycerol monostearate. Blends of dried emulsions were tested. Each emulsion was dried and tempered in accordance with the formulation and procedure disclosed in Example 12 of the Cameron et al. patent, the emulsifier level being 10% by weight of solids on a dry basis. The ratio at which the spray dried emulsion containing the propylene glycol monopalmitate and the spray dried emulsion containing the glycerol monostearate were used in sample blends corresponded directly to the ratio of propylene glycol monopalmitate and glycerol monostearate intended for evaluation. The ratios of glycerol monostearate as a percent of emulsifiers in the blend amounted to 4, 10, 17 extra space between each number and 33%, the ratios of PGMP respectively, as percent of the emulsifiers present amounted to 67, 83, 90 and 96%. These ratios are shown in Table I together with the whipping characteristics observed. The whipping characteristics of a powdered topping prepared in accordance with the process of Example 12 of the Cameron et al. patent is also shown as a control (Sample 1). It will be noted that the "propylene glycol monostearate" of the formulation in Example 12 of the Cameron et al. patent (Sample 1 of Table I) was in reality 45% propylene glycol monostearate, the balance being principally propylene glycol monopalmitate.

the propylene glycol monopalmitate modification tabulated for Sample 2; Sample 2 churns out at the same time that the product whips.

Further tests tabulated hereinafter demonstrate the relative performance of products wherein the glycerol monostearate is emulsified with propylene glycol monopalmitate prior to spray drying the emulsion. Spray dried products were made at selected ratios of propylene glycol monopalmitate to glycerol monostearate and the formulas are shown in Table 2. The whipping characteristics observed in use tests of the product are shown in Table III.

The emulsions were spray dried and tempered in accordance with Example 12 of Cameron et al. and whipped using the same recipe as for the preparation in Table I.

TABLE I.—COMPARISON OF WHIPPING CHARACTERISTICS OF CAMERON ET AL. DRIED EMULSION TOPPING WITH AND WITHOUT GLYCEROL MONOSTEARATE

| Part I. Machine Whips—Emulsifiers Contained in Powdered Topping (Example 12) Cameron et al. | 1 Regular (PGMS) | 2 PGMP | 3 GMS | 4 Blended PGMP 67, GMS 33 | 5 Blended PGMP 83, GMS 17 | 6 Blended PGMP 90, GMS 10 | 7 Blended PGMP 96, GMS 4 |
|---|---|---|---|---|---|---|---|
| Test Temp., 75°–80° F.: | | | | | | | |
| Whip Time (min.) | 4 | 2 | No Whip | 3 | 2 | 2 | 1½ |
| Churn Tolerance (min.) | 6 to 10+ | 1 | No Churn | 10+ | 10+ | 10+ | 1½ |
| Overrun (percent) | 233 | 227 | | 254 | 240 | 254 | 221 |
| Viscosity (Brookfield Units) | 24 | 25 | | 23 | 24 | 28 | 27 |
| Test Temp., 88° F.: | | | | | | | |
| Whip Time (min.) | 3½ | 1½ | | | | 1¾ | |
| Churn Tolerance (min.) | ½ | 0 | | | | 10+ | |
| Overrun (percent) | 221 | (*) | | | | 204 | |
| Viscosity (Brookfield Units) | 23 | (*) | | | | 15 | |

*Not measured because of churning.

The temperatures specified in Table I were room temperatures at the time of whipping and the topping powders were reconstituted and whipped in each case by employing 60 grams of the dried emulsion sample i.e., Samples 1–7 combined with 120 ml. of whole homogenized milk at refrigerator temperature (approximately 40–50° F.), the reconstituted product being whipped in a household mixer (Sunbeam Mix Master No. 10) at high speed (850–900 r.p.m.) for the whip time tabulated. The viscosity readings were recorded using a Brookfield viscosimeter model H.A.T. Synchroelectric Helipath equipped with a No. 5 spindle and operated at 20 revolutions per minute. The numerical values recorded are Brookfield viscosity units. "Churn Tolerance" is the additional time in minutes after optimum whip is reached in which the sample churned.

The foregoing tabulated results of whipping at normal room temperature show that when the glycerol monostearate constitutes only 4% of the emulsifiers in the blend, it has little effect in improving whipping characteristics of PGMP used alone; when the glycerol monostearate constitutes 10, 17 or 33% of the emulsifiers, the blends containing both the glycerol monostearate and the propylene glycol monopalmitate whip faster than those containing propylene glycol monostearate (Sample 1). In contrast to modification Sample 2 however, using PGMB as the sole emulsifier, the Sample 1 and blended Samples 4, 5 and 6 show a high tolerance to churning. The glycerol monostearate topping ref. Sample 3 neither whips nor churns. The results of whipping at elevated room temperature (88° F.) show that the blend containing the 10% glycerol monostearate material by weight of the emulsifier effects an increase in churn tolerance over that of the Cameron et al. composition typified by Sample 1 and far exceeds that of

TABLE II.—FORMULAE FOR SPRAY DRIED PGMP-GMS MODIFIED DRY EMULSIONS

| Raw Material | Sample A—PGMP 90, GMS 10 (percent) | Sample B—PGMP 95, GMS 5 (percent) |
|---|---|---|
| Hydrogenated Cottonseed Oil | 49.0 | 49.0 |
| PGMP | 9.0 | 9.5 |
| GMS | 1.0 | 0.5 |
| Sodium Caseinate | 10.0 | 10.0 |
| Lecithin, hydroxylated | 1.0 | 1.0 |
| Sugar | 30.0 | 30.0 |
| | 100.0 | 100.0 |

TABLE III.—PERFORMANCE RESULTS OF SPRAY DRIED PGMP-GMS MODIFIED DRY EMULSIONS

| Machine Whip | Sample A— PGMP 90, GMS 10 | Sample B— PGMP 95, GMS 5 |
|---|---|---|
| Test Temp., 75–80° F.: | | |
| Whip Time (min.) | 2 | 2 |
| Churn Tolerance (min.) | 10+ | 6 |
| Overrun (percent) | 254 | 233 |
| Viscosity (Brookfield) | 27 | 26 |
| Test Temp., 90° F.: | | |
| Whip Time (min.) | 2½ | 2 |
| Churn Tolerance (min.) | 10+ | 2 |
| Overrun (percent) | 254 | 221 |
| Viscosity (Brookfield) | 17 | 17 |

The results of machine whipping show that propylene glycol monopalmitate and glycerol monostearate may be blended into a single formulation and spray dried to provide a composition which enjoys the same whipping properties as the blended powdered emulsions illustrated as Samples 4, 5 and 6 to Table I.

It should be noted that churn tolerance for any dried emulsion is significantly reduced as the test temperature, i.e., room temperature approaches 90° F.; yet it will be noted from evaluations of Sample B in Table III that a churn tolerance of 2 minutes was provided even though the test temperature was 90° F.

While this invention has been described by reference to specific examples, it is understood to be limited only by the scope of the appended claims.

What is claimed is:

1. A topping composition characterized by its improved churn tolerance as well as its whippability comprising a powderous dried emulsion of a fat in a matrix of hydrophilic encapsulating solids wherein a partial ester of a glycol and palmitic acid is the major constituent by weight of the emulsifiers employed and a glycerol monoester of a saturated higher fatty acid ranging upwardly in chain length from 18 carbon atoms is employed at a level in excess of 2% by weight of said emulsifiers.

2. A composition according to claim 1 wherein said glycol ester is propylene glycol monopalmitate.

3. A composition according to claim 2 wherein said glycerol ester is glycerol monostearate.

4. A composition according to claim 3 wherein said glycerol and glycol ester are emulsified together in said composition prior to dehydration thereof.

5. A composition according to claim 3 wherein said glycol and said glycerol esters are contained in separately dried emulsions.

6. A composition according to claim 2 wherein said glycerol ester is present at a level of less than about 30% by weight of the total of said emulsifiers.

References Cited

UNITED STATES PATENTS

| | | | |
|---|---|---|---|
| 2,913,342 | 11/1959 | Cameron et al. | 99—139 X |
| 2,954,297 | 9/1960 | Elsesser et al. | 99—123 X |
| 3,098,748 | 7/1963 | Noznick et al. | 99—139 X |

FOREIGN PATENTS 822,614   10/1959   Great Britain.

A. LOUIS MONACELL, *Primary Examiner.*

J. M. GOLIAN, *Assistant Examiner.*